(12) United States Patent
Shurgalin et al.

(10) Patent No.: US 6,879,386 B2
(45) Date of Patent: Apr. 12, 2005

(54) OPTICAL WAVEGUIDE MONITORING

(75) Inventors: Max Shurgalin, Arlington, MA (US);
Yoel Fink, Cambridge, MA (US);
Steven G. Johnson, Cambridge, MA
(US); Mihai Ibanescu, Cambridge, MA
(US)

(73) Assignee: OmniGuide Communications,
Cambridge, MA (US)

( * ) Notice: Subject to any disclaimer, the term of this patent is extended or adjusted under 35 U.S.C. 154(b) by 99 days.

(21) Appl. No.: 10/068,998

(22) Filed: Feb. 7, 2002

(65) Prior Publication Data

US 2003/0030786 A1 Feb. 13, 2003

Related U.S. Application Data

(60) Provisional application No. 60/267,118, filed on Feb. 7, 2001.

(51) Int. Cl.[7] ................................................ G01N 21/00
(52) U.S. Cl. ...................................................... 356/73.1
(58) Field of Search ................. 356/73.1; 385/123–127, 385/31–37, 147; 359/260–263, 245–248, 586–589

(56) References Cited

U.S. PATENT DOCUMENTS

| 3,982,816 | A | 9/1976 | Watkins |
|---|---|---|---|
| 4,081,258 | A | 3/1978 | Goell et al. |
| 4,236,904 | A | 12/1980 | Lazay |
| 4,269,483 | A | 5/1981 | Feldtkeller |
| 4,583,851 | A | 4/1986 | Yataki |
| 4,678,327 | A | 7/1987 | Yoshida et al. |
| 4,793,840 | A | 12/1988 | Harding |
| 4,890,915 | A | 1/1990 | Byvik et al. |
| 5,172,421 | A | 12/1992 | Nakamura et al. |
| 5,185,636 | A | 2/1993 | Button et al. |
| 5,289,265 | A | 2/1994 | Inoue et al. |
| 5,449,393 | A | 9/1995 | Tsuneishi et al. |
| 5,534,994 | A | 7/1996 | Hanson et al. |
| 5,786,891 | A | 7/1998 | Jakobsen et al. |
| 5,999,308 | A | * 12/1999 | Nelson et al. ............... 359/321 |

OTHER PUBLICATIONS

Knight et al, All–silica single–mode optical fiber with photonic crystal cladding, Oct. 1, 1996, vol. 21, No. 19, Optics Letters.*

Gander et al. "Experimental measurement of group velocity dispersion in photonic crystal fiber", Electronics Letters, vol. 35, No. 1, Jan. 7, 1999, pp. 63–64.*

(Continued)

*Primary Examiner*—Tu T. Nguyen
(74) *Attorney, Agent, or Firm*—Fish & Richardson P.C.

(57) ABSTRACT

Techniques for monitoring the quality (e.g., optical and mechanical properties) in optical waveguides (e.g., photonic crystal fibers) are disclosed. Additionally, techniques for detecting and localizing defects in the waveguides are also described. Pulses of light are launched into one end of an optical waveguide. The amount of light scattered out of the same end of the waveguide (i.e., a backscattered or reflected signal) is monitored at certain wavelengths specific to the spectral characteristics of the waveguide. Transmission characteristics and defect localization can be determined from the backscattered signal.

67 Claims, 6 Drawing Sheets

OTHER PUBLICATIONS

C. Martijn de Sterke et al., "Differential losses in Bragg fibers," J. Appl. Phys. 76 (2) pp. 680–688, Jul. 15, 1994.

T. A. Birks et al., "Full 2–D photonic bandgaps in silica/air structure," Electronics Letters, vol. 31, No. 22, pp. 1941–1943, Oct. 26, 1995.

T. Erdogan et al., "Circularly symmetric operation of a concentric–circle–grating, surface–emitting, AlGaAs/GaAs quantum–well semiconductor laser," Appl. Phys. Lett. 60 (16) pp. 1921–1923, Apr. 20, 1992.

Y. Fink et al., "Guiding optical light in air using an all–dielectirc structure," Journal of Lightwave Technology, vol. 17, No. 11, pp. 2039–2041, Nov. 1999.

Stig E. Barkou et al., "Silica–air photonic crystal fiber design that permits waveguiding by a true photonic bandgap effect," Optics Letters, vol. 24, No. 1, pp. 46–48, Jan. 1, 1999.

J. C. Knight et al., "Photonic band gap guidance in optical fibers," SCIENCE, vol. 282, pp. 1476–1478, Nov. 20, 1998.

2001 OmniGuide Long–Haul Fiber, OmniGuide Communications Inc., Cambridge, MA.

2001 OmniGuide Passive Electromagnetic Mode Conversion in Multi–mode Waveguides and Optical Fibers, Cambridge, MA.

P. Yeh et al., "Theory of Bragg Fiber", J. Opt. Soc. Am., vol. 68, pp. 1196, 1978.

M. K. Barnoski et al., Applied Optics, vol. 16, pp. 2375, 1977.

* cited by examiner

OPTICAL WAVEGUIDE MONITORING

CROSS-REFERENCE TO RELATED APPLICATIONS

This application claims priority to U.S. Provisional Patent Application Ser. No. 60/267,118, filed Feb. 7, 2001, the contents of which are incorporated herein by reference.

TECHNICAL FIELD

This invention relates to optical waveguides, and more particularly to monitoring optical waveguides.

BACKGROUND

Optical waveguides guide optical signals to propagate along a preferred path or paths. Accordingly, they can be used to carry optical signal information between different locations and thus they form the basis of optical telecommunication networks. The most prevalent type of optical waveguide is an optical fiber based on index guiding. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts of up to about 2–3% for wavelengths in the range of 1.5 microns.

Another type of waveguide fiber, one that is not based on TIR index-guiding, is a Bragg fiber, which includes multiple dielectric layers surrounding a core about a waveguide axis. The multiple layers form a cylindrical mirror that confines light to the core over a range of frequencies. The multiple layers form what is known as a photonic crystal, and the Bragg fiber is an example of a photonic crystal fiber.

An important characteristic of an optical waveguide is the transmission loss, or attenuation, of the waveguide. Transmission loss can be described as a logarithmic relationship between the optical output power and the optical input power in a waveguide system. It is a measure of the decay of signal strength, or loss of light power, that occurs as light pulses propagate through the length of a waveguide. Transmission loss can be caused by several intrinsic and extrinsic factors. In optical fibers, for example, intrinsic factors include scattering and absorption. Extrinsic causes of attenuation include cable-manufacturing stresses, environmental effects, and physical bends in the fiber.

Much effort has been devoted to minimizing fiber transmission losses and a number of techniques have been developed to measure and monitor waveguide losses during waveguide manufacturing and cabling processes. In one such method for optical fibers, light is launched into one end of the fiber as it is being drawn and a detector, attached to the other end of the fiber, monitors the amount of light transmitted through the fiber as a function of the length of the fiber.

SUMMARY

The invention features techniques for monitoring the quality (e.g., optical and mechanical properties) in optical waveguides (e.g., photonic crystal fibers). Additionally, the invention features techniques for detecting and localizing defects in the waveguides. Pulses of light are launched into one end of an optical waveguide. The amount of light scattered out of the same end of the waveguide (i.e., a backscattered or reflected signal) is monitored at certain wavelengths specific to the spectral characteristics of the waveguide. Transmission characteristics and defect localization can be determined from the backscattered signal.

The inventors have recognized that in certain optical waveguides, such as photonic crystal fibers, the transmission loss of an optical signal is strongly dependent on the wavelength of the optical signal. Accordingly, monitoring the transmission loss in a wavelength range where the loss is extremely sensitive to wavelength can provide information about defects that change the spectral transmission properties of the waveguide. For example, in a photonic crystal fiber, transmission loss within a range of wavelengths (e.g., the bandgap) can be extremely low (e.g., no more than 0.1 dB/km, such as 0.05 dB/km). At the bandgap edges the transmission loss changes rapidly (e.g., near a bandgap edge, the transmission loss may vary exponentially, such as increasing from 0.5 dB/km to 5.0 dB/km in a 0.06 $\mu$m wavelength range). Hence, the strength of a backscattered signal monitored at a wavelength near the bandgap edge should be extremely sensitive to any change in the bandgap.

The inventors have also recognized that monitoring the backscattered signal intensity at different wavelengths and comparing the change in backscattered signal intensity at the different wavelengths enables assessing the fiber photonic bandgap uniformity along the fiber length. Moreover, monitoring the time lapse between launching and detecting a signal is proportional to the distance propagated by the signal in the waveguide. Hence, measuring the propagation time of a backscattered signal allows the position of a defect in the waveguide to be determined.

In general, in one aspect, the invention features a method for monitoring the quality of a photonic crystal fiber (e.g., a Bragg fiber), which includes launching test light into an end of the photonic crystal fiber; detecting measurement light from the photonic crystal fiber (e.g., from the end of the photonic crystal fiber.) in response to the launched test light; and determining the quality of the photonic crystal fiber according to the measurement light.

Implementations of the invention may include any of the following features.

The test light can include a test pulse at a first wavelength or at multiple wavelengths. The test light can also include multiple pulses each at a different wavelength.

The inventive method can also include measuring a first measurement signal corresponding to the intensity of the measurement light at a first wavelength, the first wavelength being related to a bandgap of the photonic crystal fiber. The first wavelength can be near a first edge of the bandgap of the photonic crystal fiber. The method can further include measuring a second measurement signal corresponding to the intensity of the measurement light at a second wavelength different from the first wavelength, the second wavelength being related to the bandgap of the photonic crystal fiber. The second wavelength can be near the center of the bandgap. The method can additionally include measuring a third measurement signal corresponding to the intensity of the measurement light at a third wavelength different from the first and second wavelengths, the third wavelength being selected near to the center of the bandgap of the photonic crystal fiber.

In some embodiments, determining the quality of the photonic crystal fiber includes determining a difference between the first measurement signal and the second measurement signal.

In some implementations, the inventive method also includes measuring a time lapse between launching the test light and detecting the measurement light and determining a distance related to the time lapse.

The measurement light can include backscattered light from the photonic crystal fiber in response to the launched test light.

The method can include drawing a photonic crystal fiber preform into the photonic crystal fiber and determining the quality of the photonic crystal fiber occurs during the drawing. Alternatively, or additionally, the method can include cabling the photonic crystal fiber and determining the quality of the photonic crystal fiber occurs during the cabling.

Launching the test light can include heating a photonic crystal fiber preform to cause thermal emission of the test light.

Determining the quality of the photonic crystal fiber can include monitoring relative changes of the measurement light intensity about a center wavelength of the bandgap of the photonic crystal fiber. Determining the quality of the photonic crystal fiber can also include differentiating between different photonic crystal fiber defects (e.g., layer defects and core radius defects) based on the relative changes of the measurement light intensity. Monitoring the quality of the photonic crystal fiber can include differentiating between different photonic crystal fiber defects based on the function of the first measurement signal and the second measurement signal. The function can based on the difference between the first measurement signal intensity and the second measurement signal (e.g., the function is the difference between the first measurement signal and the second measurement signal).

In general, in a second aspect, the invention features an apparatus for monitoring the quality of a photonic crystal fiber. The apparatus includes a light source capable of providing test light at a first wavelength related to a bandgap of the photonic crystal fiber, an optical assembly positioned to direct light from the light source into an end of the photonic crystal fiber and to collect light from the end of the photonic crystal fiber, and a detector positioned to detect the light collected from the photonic crystal fiber in response to the test light, and the detector is capable of detecting light at the first wavelength and light at the second wavelength. The apparatus further includes an electronic controller coupled to the light source and detector, and during operation the electronic controller causes the light source to emit test light having a first component at the first wavelength and a second component at the second wavelength and the controller records an the intensity of a first measurement signal corresponding to the first test light component and the intensity of a second measurement signal corresponding to the second test light component, and the controller monitors the quality of the photonic crystal fiber from a function of the intensity of the first and second measurement signals (e.g., a function based on the difference of the intensity of the first and second measurement signals).

Implementations of the invention may include any of the features of the foregoing method, and any of the following features.

During operation the controller can monitor a time lapse between the light source emitting the test light and the detector detecting the corresponding measurement signal.

The light source can be capable of emitting test light having a first component at the first wavelength and a second component at a second wavelength different from the first wavelength, and wherein the second wavelength is related to the bandgap of the photonic crystal fiber.

The apparatus can further include a photonic crystal fiber preform and at least a portion of the optical assembly is positioned within a hollow core of a photonic crystal fiber preform from which the photonic crystal fiber is drawn. The optical assembly can include a length of photonic crystal fiber.

The apparatus can include a photonic crystal fiber drawing apparatus, and the electronic controller causes the light source to emit test light and records the intensity of the first measurement signal while the photonic crystal fiber is drawn using the photonic crystal fiber drawing apparatus.

The apparatus can include a photonic crystal fiber cabling apparatus, and the electronic controller causes the light source to emit test light and records the intensity of the first measurement signal while the photonic crystal fiber is cabled using the photonic crystal fiber cabling apparatus.

In general, in another aspect, the invention features a method for monitoring the quality of an optical waveguide. The method includes launching test light into an end of the optical waveguide, detecting measurement light emitted from the optical waveguide in response to the test light, and measuring the measurement light intensity at a first wavelength and the measurement light intensity at a second wavelength. The method also includes monitoring the quality of the optical waveguide based on a function of the measurement light intensity at a first wavelength and the measurement light intensity at a second wavelength.

Implementations of the invention may include any of the features of the foregoing aspects of the invention. Implementations of the invention may also include any of the following features.

The optical waveguide can be a photonic crystal fiber (e.g., a Bragg fiber) and the first and second wavelengths are related to a bandgap of the photonic crystal fiber. The optical waveguide can be an optical fiber.

The method can include drawing an optical waveguide preform to form the optical waveguide and monitoring the quality of the optical waveguide occurs during drawing.

The method can also include cabling the optical waveguide and monitoring the quality of the optical fiber occurs during the cabling.

The test light can include light having a desired mode. The optical waveguide can have a hollow core.

Unless otherwise defined, all technical and scientific terms used herein have the same meaning as commonly understood by one of ordinary skill in the art to which this invention belongs. Although methods and apparatus similar or equivalent to those described herein can be used in the practice or testing of the present invention, suitable methods and apparatus are described below. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Additional features, objects, and advantages of the invention will be apparent from the following detailed description and drawings, and from the claims.

DESCRIPTION OF DRAWINGS

The invention will now be further described merely by way of example with reference to the accompanying drawings in which.

Like reference symbols in the various drawings indicate like elements.

DETAILED DESCRIPTION

Figure 1:
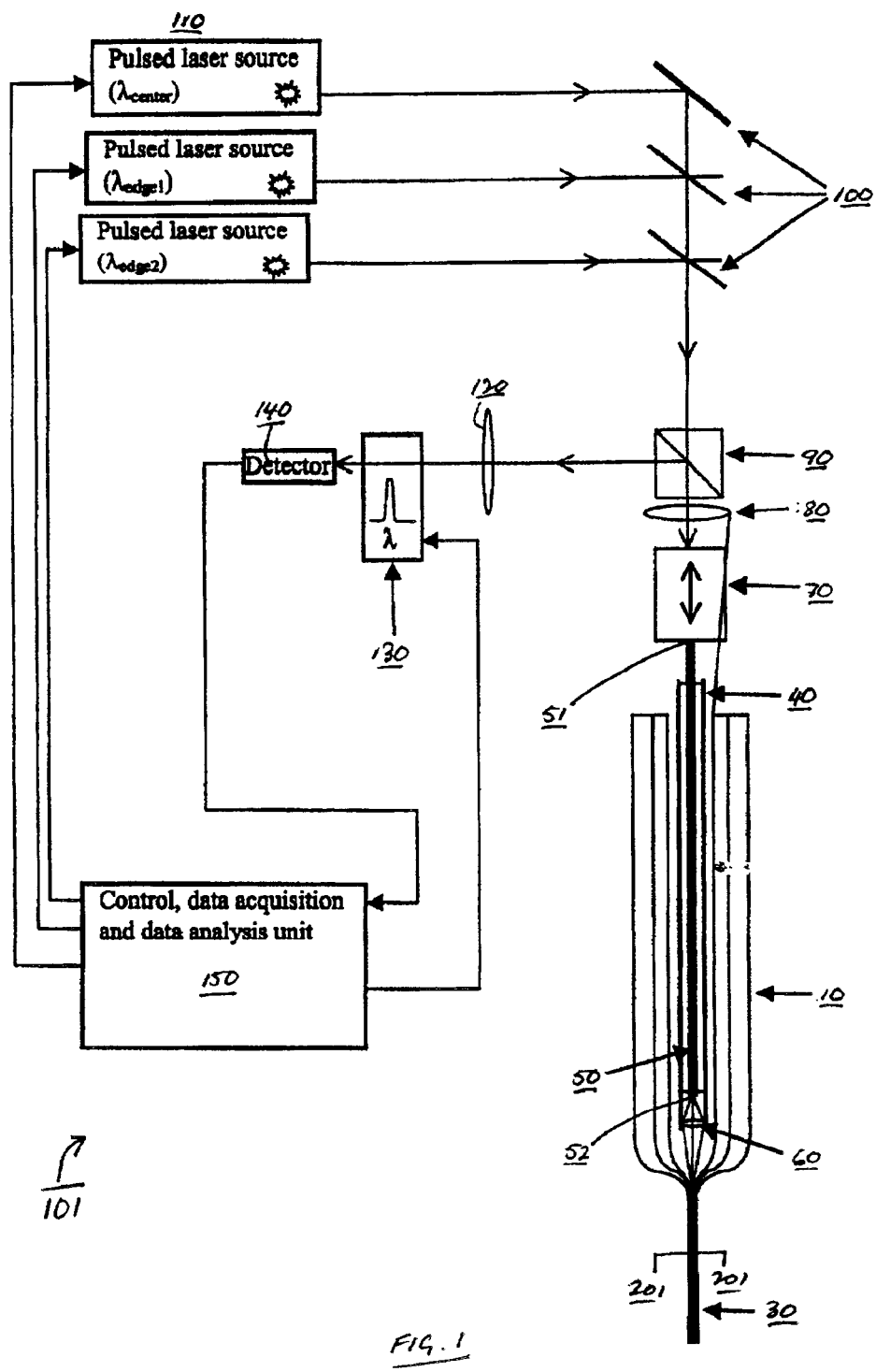
FIG. 1 is a schematic diagram of an embodiment of a waveguide monitoring apparatus.

The invention features methods for detecting defects in and monitoring the transmission loss of an optical waveguide, during, for example, drawing or cabling of an optical waveguide. For example, the invention relates to monitoring the quality (e.g., monitoring transmission loss and detecting structural and compositional defects) of optical waveguides that utilize photonic bandgap confinement mechanisms for guiding light (referred to here as photonic crystal fibers), including hollow fibers. In general, defects refer to any structural, compositional or other perturbation of the fiber from its ideal design, which can affect the optical and/or mechanical performance and reliability of the fiber. Examples of defects include perturbations to core radius, perturbations to the layer thickness, delamination between layers, bubbles, particle inclusions in the core or layers, and compositional variations in the layers affecting the refractive index of the layers.

Fiber monitoring is performed by launching test light into one end of a photonic crystal fiber. The amount of light backscattered scattered and guided back out through the end of the fiber is measured at one or more wavelength (or wavelength bands). At least one of the wavelengths is selected to be near to photonic bandgap (PBG) edges (the bandgap edge wavelengths). Often, particularly for telecommunications, the wavelengths will be selected in the near infrared region of the electromagnetic spectrum (e.g., between 1 and 2 $\mu$m). However, the methods and apparatus disclosed herein may be applied using light of any wavelength, such as ultraviolet (e.g., less than about 0.38 $\mu$m), visible (e.g., between about 0.38 $\mu$m and 0.78 $\mu$m), and infrared light (e.g., greater than about 0.78 $\mu$m up to about 10 $\mu$m). Wavelengths are selected near to the bandgap edge because confinement of an optical signal in a photonic crystal fiber decreases in an exponential-like fashion as the wavelength of the signal approaches the PBG edge. Hence, any defect in a fiber that either shifts the spectral position or the width of the PBG should most dramatically affect the confinement of a signal at or near the bandgap edge. A change in the backscattered signal intensity at a PBG edge thus indicates a structural or compositional change in the fiber.

Backscattered signals monitored at wavelengths at, or near, the center of the bandgap can also provide information about the structural and transmission properties of a photonic crystal fiber. Measuring the amount of light scattered and guided back at wavelengths near the bandgap center allows one to determine the fiber transmission loss under the strongest light confinement conditions. Moreover, observing the transmission loss at different wavelengths and comparing the change in transmission loss at the bandgap edge wavelengths relative to the bandgap center wavelength enables assessing the fiber photonic bandgap uniformity along the fiber length.

Alternatively, or additionally, information about the location and extent of possible PBG defects and/or PBG non-uniformity can be obtained by measuring the backscattered signal intensities at different wavelengths as functions of time elapsed since launching the light pulses. The time elapsed between launching and detecting signals is directly proportional to the distance propagated by the signal in the fiber. Since the velocity of a signal in the waveguide is known, the signal propagation distance can be determined from this propagation time. The location of a defect responsible for the backscattered signal is therefore half the signal propagation distance from the end of the fiber.

Referring to FIG. 1, an optical fiber monitoring system 101 monitors a newly drawn photonic crystal fiber 30 for defects. Monitoring system 101 includes a series of light sources 110 (e.g., pulsed laser diode sources) and combining optics 100, which, during operation, direct light from light sources 110 towards a first end of photonic crystal fiber 30. Focusing optic 80 and light launching assembly 40 serve to efficiently couple light into and out of photonic crystal fiber 30.

Light sources 110 include three pulsed laser diode sources, which are operated at three different wavelengths corresponding to the center and edge wavelengths of the photonic bandgap of fiber 30. Combining optics 100, including a mirror and beamsplitters, combine the three laser beams from each of the respective laser diode sources into a single beam, and direct the single light beam toward light launching assembly 40.

Light launching assembly 40 includes a piece of hollow fiber 50 and a miniature focusing optic 60. Light launching assembly 40 has an outer diameter slightly smaller than the bore diameter of photonic crystal fiber preform 10, from which photonic crystal fiber 30 is drawn. Light launching assembly 40 is designed this way so it can be inserted into the bore of preform 10. Light may be coupled into light launching assembly 40 via a mode coupler device 70, which can be used to excite a desired mode(s), e.g., the $TE_{01}$ mode, in hollow fiber 50. Mode coupler device 70 is attached to an end 51 of hollow fiber 50, and also serves as a mode converter. The mode coupler device can enhance efficiency of coupling light into and out of the end of the fiber, although, in other embodiments, a mode coupler device may not be necessary.

The opposite end 52 of hollow fiber 50 is positioned near the heated neck of photonic crystal fiber preform 10, where the actual process of fiber extrusion takes place. Hollow fiber end 52 may be placed as close to the heated neck of preform 10 as the radiative heating of light launching assembly 40 will allow. To alleviate heating of hollow fiber 50, it can be enclosed in tube (not shown) of a higher thermal conductivity heat resistant material, such as a metal (e.g., copper) or alumina (if dielectric material is needed). Gas purging can additionally be used to alleviate heating of hollow fiber 50. In some cases, such as for preforms that have large bore diameters, water-cooling can be employed.

Miniature focusing optic 60 focuses light from end 52 of hollow fiber 50 into the starting end of drawn fiber 30 and collects backscattered light from drawn fiber 30, directing it into hollow fiber 50. Miniature focusing optic 60 can be made out of a heat resistant material, such as sapphire or fused silica. The position of miniature focusing optic 60, or the entire light launching assembly 40, with respect to preform 10 can be optimized when observing backscattered signals as described below.

Light backscattered from drawn photonic crystal fiber 30 propagates back through light launching assembly 40 and mode converter 70. A beamsplitter 90 decouples backscattered light from the combined laser beam and directs the backscattered light through a focusing optic 120 to a photodetector 140. Prior to impinging photodetector 140, the backscattered signals at different wavelengths are separated by wavelength notch filters 130, which are placed in front of photodetector 140. Wavelength notch filters 130 allow photodetector 140 to measure the intensity of backscattered light at the narrow wavelength bands of the laser diodes, while improving the signal to noise ratio at each wavelength by reducing the noise signal from ambient illumination.

In some embodiments, wavelength notch filters 130 can be dynamically switchable in order to obtain signals at particular, desired wavelengths. In such arrangements, the backscattered signals at different wavelengths are obtained and analyzed in sequence, corresponding to sequentially pulsed laser diodes. Alternatively, the backscattered light can be divided into three paths and detected with three separate detectors, each with its own separate notch filter. Embodiments utilizing multiple detectors can function at faster detection rates than a single detector, provided the detectors have sufficiently fast response times. Examples of detectors include InGaAs photodetectors, thermoelectrically or liquid nitrogen cooled to allow detecting low intensity signals. During the laser light pulse the detectors can be switched off to prevent detector saturation by light scattered outside the drawn optical fiber by elements of the fiber monitoring system.

A control unit 150 (e.g., a computer-based control unit) controls laser diodes 110, detector 140, and wavelength notch filters 130. Control unit 150 additionally performs all data acquisition and analysis, which will be discussed below. Control unit 150 can additionally communicate with the fiber drawing apparatus (not shown), causing the apparatus to adjust various draw parameters in response to particular changes in the backscattered signals.

Figure 2:
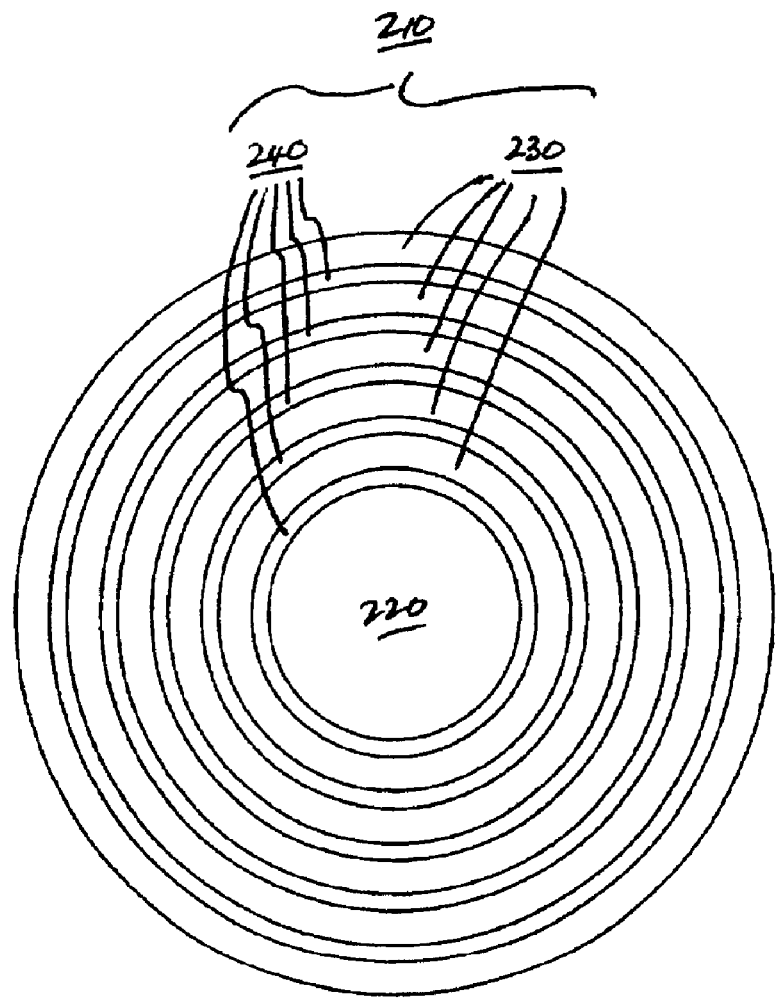
FIG. 2 is a cross-sectional profile of an embodiment of a photonic crystal fiber.

The cross-section 201 of photonic crystal fiber 30 is shown in FIG. 2 and includes a dielectric core 220 extending along a waveguide axis and a dielectric confinement region 210 surrounding the core. In the embodiment of FIG. 2, confinement region 210 is shown to include alternating layers 230 and 240 of dielectric materials having different refractive indices. One set of layers, e.g., layers 240, define a high-index set of layers having an index $n_{hi}$ and a thickness $d_{hi}$, and the other set of layers, e.g., layers 230, define a low-index set of layers having an index $n_{lo}$ and a thickness $d_{lo}$, where $n_{hi} > n_{lo}$. For convenience only a few of the dielectric confinement layers are shown in FIG. 2. In practice, confinement region 210 may include many more layers (e.g., twenty or more layers). Photonic crystal fiber 30 may further include an additional structural cladding layer (not shown) surrounding the confinement region 210 to provide structural support to the waveguide as a whole. Because the structural layer does not contribute substantially to the optical properties (e.g., radiative losses and dispersion) of the waveguide, we do not discuss it further.

Photonic crystal fiber 30 has a circular cross-section, with core 220 having a circular cross-section and region 210 (and layers therein) having an annular cross-section. In other embodiments, however, the waveguide and its constituent regions may have different geometric cross-section such as a rectangular or a hexagonal cross-section. Furthermore, as mentioned below, core and confinement regions 220 and 210 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 220 and 210, however, is defined by a change in index. The change may be caused by the interface of two different dielectric materials or by different dopant concentrations in the same dielectric material (e.g., different dopant concentrations in silica).

Dielectric confinement region 210 guides EM radiation in a first range of wavelengths to propagate in dielectric core 220 along the photonic crystal fiber axis. The confinement mechanism is based on a photonic crystal structure in region 210 that forms a bandgap including the first range of wavelengths. Because the confinement mechanism is not index-guiding, it is not necessary for the core to have a higher index than that of the portion of the confinement region immediately adjacent the core. To the contrary, core 220 may have a lower average index than that of confinement region 210. For example, core 220 may be air, some other gas, such as nitrogen, or substantially evacuated. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 220 may include a porous dielectric material to provide some structural support for the surrounding confinement region while still defining a core that is largely air. Accordingly, core 220 need not have a uniform index profile.

The alternating layers 230 and 240 of confinement region 210 form what is known as a Bragg fiber. The alternating layers are analogous to the alternating layers of a planar dielectric stack reflector (which is also known as a Bragg mirror). The annular layers of confinement region 210 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 210 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega=c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

When alternating layers 230 and 240 in confinement region 210 give rise to an omnidirectional bandgap with respect to core 220, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflectivity in a planar geometry of at least 95% for all angles of incidence ranging from 0° to 80° and for all polarizations of EM radiation having frequency in the omnidirectional bandgap. Furthermore, even when photonic crystal fiber 30 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al., *Science* 285:1537–1539, 1999. Furthermore, even in a Bragg-like configuration, the high-index layers may vary in index and thickness, and/or the low-index layers may vary in index and thickness. In general, the confinement region may be based on any index modulation that creates a photonic bandgap.

In the present embodiment, multilayer structure 210 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness $\lambda/4$, or equivalently $d_{230}/d_{240}=n_{lo}/n_{hi}$, where d and n refer to the thickness and index, respectively, of the high-index and low-index layers. These correspond to layers 240 and 230, respectively. Normal incidence, however, corresponds to $\beta=0$, whereas for a cylindrical waveguide the desired modes typically lie near the light line $\omega=c\beta$ (in the large core radius limit, the lowest-order modes are essentially plane waves propagating along z-axis, i.e., the waveguide axis). In this case, the quarter-wave condition becomes:

$$\frac{d_{230}}{d_{240}} = \frac{\sqrt{n_{lo}^2-1}}{\sqrt{n_{hi}^2-1}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

Light coupled into the fiber by light launching assembly 40 propagates in the hollow core surrounded by the multi-layer dielectric structure with periodic refractive index modulation, which provides photonic bandgap confinement of light within the core. Typically, photonic crystal fiber 30 is a multi-mode fiber, however, the differences in attenuation for different modes can be large enough so that all modes but one are sufficiently decayed after a certain distance so the fiber functions as a single mode fiber after that distance. See, for example, commonly owned U.S. application Ser. No. 10/057,258, entitled "Low-loss photonic crystal waveguide having large core radius," filed Jan. 25, 2002. and now issued as U.S. Pat. No. 6,625,364. In this example, the mode with the lowest attenuation is the $TE_{01}$ mode, which is the mode for which transmission losses are measured. Fiber/mode converter 70 assists in suppressing modes other than the $TE_{01}$ mode.

Attenuation of optical signals in the photonic crystal fibers can arise from numerous sources. In photonic crystal fibers having gas-filled low density hollow cores, Rayleigh scattering can be significantly less than in regular total internal reflection (TIR) fibers. This results in lower transmission loss due to Rayleigh scattering and absorption in the core. One mechanism for light attenuation is radiation loss, arising from leakage of light out of the core. Radiation loss is usually determined directly by the PBG confinement properties. In addition to radiation loss, there is also some attenuation due to absorption in the multilayer cladding structure because a certain amount of light penetrates and propagates in the cladding. The depth of penetration is again determined directly by the PBG confinement properties. Therefore, there is often no need to make a distinction between the above-described attenuation mechanisms when considering transmission loss in photonic crystal fibers.

In hollow fibers, little Rayleigh scattering typically results in a much smaller backscattered signal than for TIR fibers. In such cases, intense light sources and/or highly sensitive detection methods should be employed. For example, intense laser light sources can be used in conjunction with wavelength selection notch filters for background light rejection and heterodyne detection schemes. Examples of various detection schemes are described by Tateda and Hiroguchi in "Advances in Optical Time-Domain Reflectometry," *J. Lightwave. Tech.,* 8, (7) pp.1271–1224, 1989.

Figure 3:
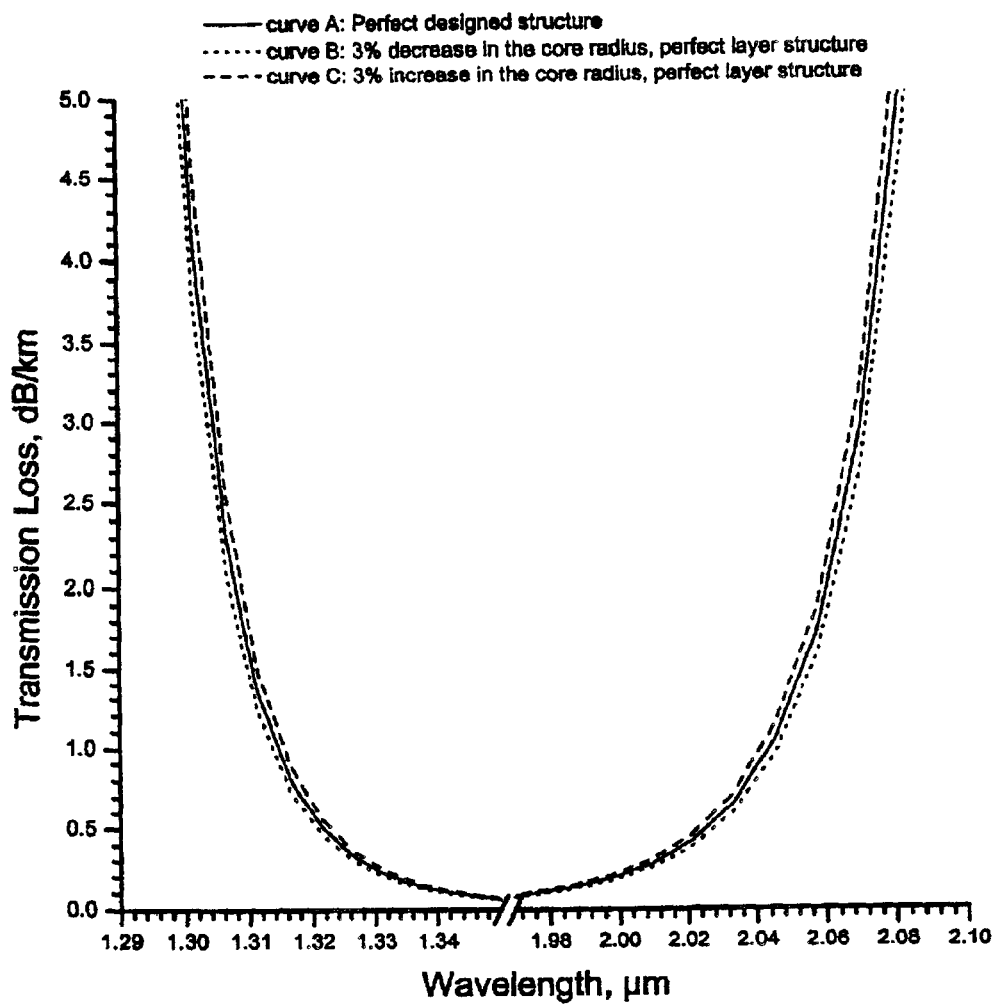
FIG. 3 is a plot comparing the modeled transmission loss of a photonic crystal fiber as a function of wavelength for an ideal fiber and fibers with a perturbed core radius.
Figure 4:
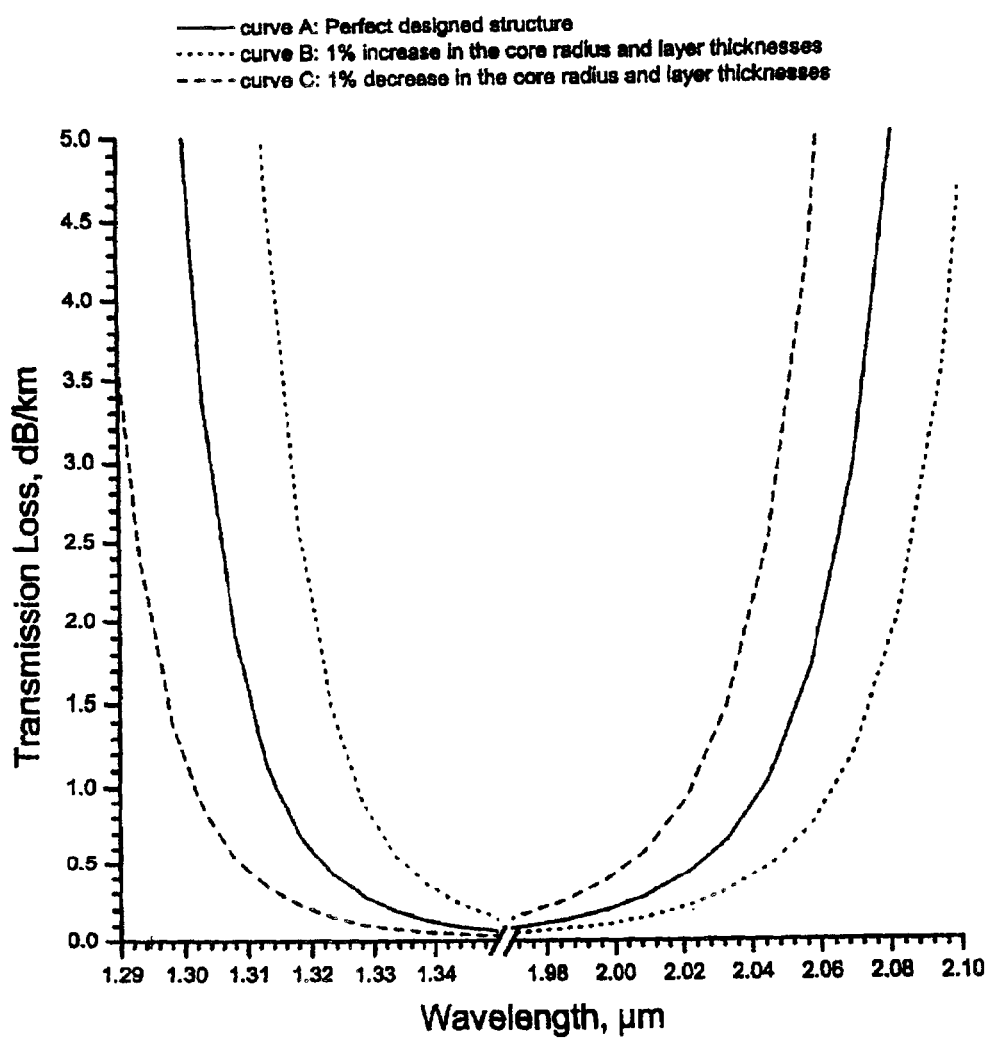
FIG. 4 is a plot comparing the modeled transmission loss of a photonic crystal fiber as a function of wavelength for an ideal fiber and fibers with a perturbed core radius and layer thickness.
Figure 5:
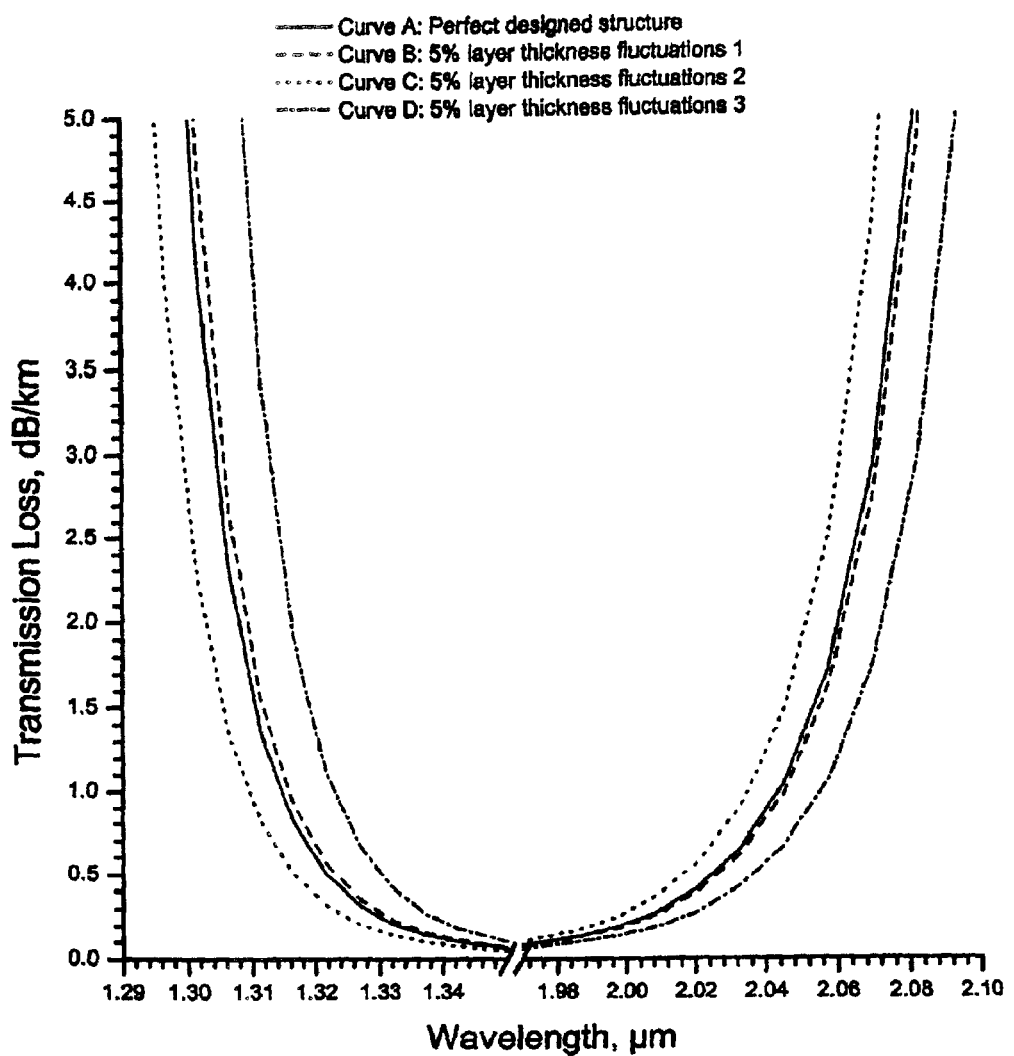
FIG. 5 is a plot comparing the modeled transmission loss of a photonic crystal fiber as a function of wavelength for an ideal fiber and fibers with a perturbed layer thickness.

FIGS. 3, 4, and 5 present calculated transmission loss near the PBG band edges of the $TE_{01}$ mode as a function of wavelength for a hollow fiber with an ideal multilayer cladding structure and core radius, and for the same fiber but with different perturbations of the cladding and core. Nominal values for the refractive indexes and layer thickness were $n_{lo}=1.5$, $n_{hi}=2.8$, $d_{230}=0.363$ $\mu$m, $d_{240}=0.149$ $\mu$m. The multilayer cladding had 28 layers, and the core radius was taken to be 15.4 $\mu$m. Transmission values were calculated using the modeling methods described by Steven G. Johnson et al., "Low-loss asymptotically single-mode propagation in large core OmniGuide fibers," *Optics Express,* 9 (13), pp.748–779 (2001) and references therein, which is incorporated herein by reference.

Referring specifically to FIG. 3, changes in attenuation caused by perturbations of the hollow core, such as a decrease in the core radius by 3% (curve B) and an increase in core radius by 3% (curve C), are compared to an ideal transmission loss spectrum (curve A). Increasing the core radius results in a narrower loss curve for the propagating fiber modes and the losses at the wavelengths nearer the bandgap edges increases, e.g., at 1.31 $\mu$m from 1.7 dB/km to 1.89 dB/km, while at the center wavelength, 1.55 $\mu$m, losses remain almost unchanged. On the other hand, decreasing the core radius results in a broader loss curve for the propagating fiber modes and the losses at the wavelengths nearer the bandgap edges decrease, e.g., at 1.31 $\mu$m from 1.7 dB/km to 1.53 dB/km. Such changes can be detected as differences between the signals at each of the bandgap edge wavelength and at the center wavelength.

Referring to FIG. 4, the changes in attenuation caused by a change in the thickness in all layers of the multilayer structure by 1% from the designed values are shown. Curves B (C) shows the transmission loss for a fiber with a decrease (increase) in layer thickness. Such perturbations can arise during the drawing process when changes in the outside fiber diameter, which is usually monitored during fiber drawing, affect the layer thickness and the core radius proportionally. As shown, the perturbations can lead to large shifts of the loss curve with respect to the designed center wavelength and produce very large differences between the signals at the bandgap edge wavelengths. As above, these shifts can be detected by monitoring the difference between the transmission loss at the band edge and at or near the band center wavelength. Note that as the bandgap depends on the optical thickness, (i.e., the product of refractive index and thickness, n×d), rather than the physical thickness alone, perturbations in the refractive index of the layers are expected to result in similar changes to the bandgap.

Referring to FIG. 5, curves B, C, and D present the $TE_{01}$ transmission losses when each layer of the multilayer structure is perturbed by random thickness fluctuations. The fluctuation amplitude is 5% of the optimal thickness and the three curves show different randomly realized fluctuations. The layer thickness fluctuations mainly result in shifting the position of the curve with respect to the designed center wavelength, rather than changing the loss curve width. Therefore, the loss at one bandgap edge can increase with a simultaneous decrease of the loss at the other bandgap edge wavelength. For example, curve C is shifted to shorter wavelengths from the bandgap of the defect-free structure, while curve D is shifted to longer wavelengths. Hence, near the first bandgap edge, e.g., at $\lambda=1.32$ $\mu$m, transmission loss for curve C decreases to 0.25 dB/km, while transmission loss for curve D increases to 1.5 dB/km (the defect-free fiber has a loss of 0.6 dB/km). Conversely, near the other bandgap edge, e.g., at $\lambda=2.04$ $\mu$m, transmission loss for curve C increases to 1.4 dB/km, while transmission loss for curve D decreases to 0.5 dB/km (at this wavelength, the defect-free fiber has a loss of 0.9 dB/km). Such changes can be detected as a difference and/or change in the difference between signals monitored at the bandgap edge wavelengths.

Referring to FIGS. 3–5, the ideal transmission loss spectrum is approximately symmetric about the photonic bandgap center wavelength. While information about photonic crystal fiber defects can be obtained simply by monitoring changes in transmission loss at different wavelengths in the spectrum, it is also possible to obtain information about the nature of photonic crystal fiber defects by monitoring the symmetry of any changes in the transmission loss curve with respect the bandgap center wavelength. For example, defects affecting the core radius result in symmetric changes to the transmission loss curve with respect to the bandgap center wavelength. However, defects affecting the layer thickness shift the position of the transmission loss curve, resulting in asymmetric changes of the transmission loss curve with respect to the bandgap center wavelength. Therefore, while the methods disclosed herein can be used to detect any defect that causes a bandgap perturbation, it may be possible to differentiate between different defect types (e.g., core radius defects and layer thickness defects) by monitoring the symmetry of changes to the transmission loss curve with respect to the center wavelength.

Figure 6:
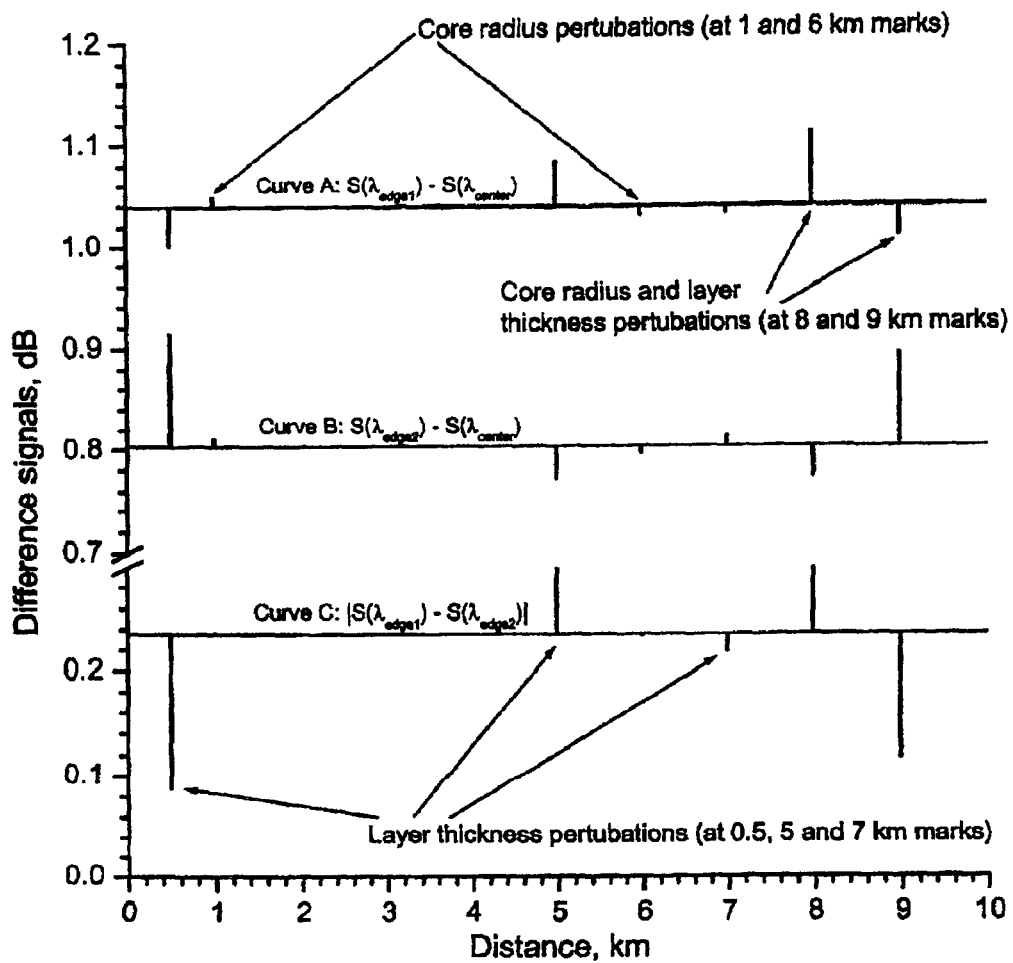
FIG. 6 is a plot showing a simulated measurement signal for a photonic crystal fiber with various defects at different positions along its length.

In some embodiments, the controller can monitor the changes of the transmission loss curve with respect to the bandgap center wavelength from functions that compare the intensity of the backscattered signals detected at different wavelengths related to the photonic bandgap (e.g., wavelengths near either bandgap edge and near or at the bandgap center). For example, the controller can calculate the difference between signals monitored at the bandgap edges, and between the bandgap edges and the bandgap center. Referring to FIG. 6, a difference signal simulation for the exemplary hollow photonic crystal fiber with the core filled with nitrogen or air is shown. The position of defects in the fiber is determined by measuring the time lapse between launching the pulse into the fiber and when the backscattered signal is detected. The distance, plotted in FIG. 6 on the horizontal axis, is proportional to this time lapse. The Rayleigh scattering loss used in this simulation is 0.001 dB/km (M. Bass et al., Handbook of Optics, McGraw-Hill, 1995) and the spatial resolution is 20 m. The intensity of the backscattered signal at a particular wavelength is determined by Rayleigh scattering loss, the backscattered capture coefficient and attenuation in the fiber an is of the order of −60 dB. The control unit calculates the difference between the backscattered signals measured at the different measurement wavelengths. Curve A in FIG. 6 shows the difference between the bandgap center wavelength signal intensity (i.e., at 1.55 $\mu$m in this case), $S(\lambda_{center})$, and the signal intensity at the first bandgap edge wavelength (i.e., 1.32 $\mu$m), $S(\lambda_{edge1})$. Curve B shows the difference between $S(\lambda_{center})$ and the second bandgap edge wavelength signal intensity (i.e., 2.05 $\mu$m), $S(\lambda_{edge2})$. Curve C shows the absolute value of the difference between $S(\lambda_{edge1})$ and $S(\lambda_{edge2})$. The different perturbations used in this simulation are 1 meter in length, and are detectable at the spatial resolution of 20 meters. Their exact location can be determined up to this resolution limit.

As is evident in FIG. 6, each perturbation results in a detected signal in each of the measured curves (curves A, B, and C). Core radius perturbations retain symmetry of the bandgap about the center wavelength (see FIG. 3). Hence, $S(\lambda_{edge1})$ and $S(\lambda_{edge2})$ change by the same amount, while $S(\lambda_{center})$ is mostly unaffected. Therefore, the signal strength of these perturbations in curve C ($|S(\lambda_{edge1})-S(\lambda_{edge2})|$) is usually substantially weaker than the signal strength in curves A and B ($S(\lambda_{edge1,edge2})-S(\lambda_{center})$). Perturbations that affect the layer thickness, on the other hand, result in a shift of the bandgap with respect to the center wavelength. Hence, depending on whether the layer thickness increases or decreases, one of $S(\lambda_{edge1})$ and $S(\lambda_{edge2})$ will increase as it is shifted further from the new, perturbed bandgap center wavelength, while the other will be shifted closer to the bandgap center wavelength and will decrease. $S(\lambda_{center})$ may also change, although sensitivity at the center wavelength is much lower than at the bandgap edges. Layer thickness perturbations thus result in the strongest signals in $|S(\lambda_{edge1})-S(\lambda_{edge2})|$, curve C. Therefore it may be possible to identify the nature of the perturbation, or to differentiate between different perturbations, by comparing the relative intensity of the defect signal in each difference curve.

While the foregoing embodiment monitors photonic crystal fiber defects by calculating the difference between signals at different wavelengths, the invention is not so limited. In general, any suitable function that evaluates changes in the symmetry of the photonic bandgap with respect to the bandgap center wavelength and/or compares the intensity, or change in intensity at one or more wavelengths with another value can be used. For example, the controller can calculate the ratio of signals at one or more wavelengths, or the ratio of the logarithm of the signals. Alternatively, or additionally, the signals can be compared with theoretically or empirically determined values. In other embodiments still, the signal strength at each wavelength is simply recorded for future reference and offline data analysis.

In general, the selection of wavelengths launched into the fiber is determined by the requirements of the specific application of the method in practice. To increase the sensitivity of the measurements of transmission losses to perturbations of the photonic bandgap structure, for example, wavelengths can be chosen closer to the actual photonic bandgap edges. This can, however, also lead to increases in the transmission loss itself at these wavelengths, thus potentially restricting the maximum distance over which the fiber can be monitored. For applications such as fiber drawing process control, where only the newly drawn section of fiber needs to be inspected, wavelengths can be chosen for maximum sensitivity. However, during the cabling process, for example, where longer fiber lengths need to be monitored, the bandgap edge wavelengths should be chosen closer to the bandgap center.

While the foregoing embodiment refers to a multilayer photonic crystal fiber, the method described can be used to monitor any photonic crystal fiber. More generally, the monitoring methods described above can be applied to any waveguide, e.g, optical fiber, which has, at least, a region of strong spectral dependence on transmission loss, e.g., sufficiently strong spectral dependence such that any waveguide defect that affects the spectral transmission properties of the waveguide provides a detectable backscattered signal in response to a probe signal at a wavelength in the region of strong spectral dependence.

Furthermore, while the light source depicted in FIG. 1 includes three laser diodes, in general the invention is not so limited. Any light source that provides radiation at the desired wavelengths can be used. For example, a broadband source can be used; with or without wavelength notch filters centered on the desired measurement wavelengths. A light source with appropriate field profile can also be used. For example, a concentric-circle-grating surface emitting laser diode, the output of which can be efficiently coupled into the $TE_{01}$ mode of a hollow waveguide. An example of such a light source is described in T. Erdogan et al., *Appl. Phys. Lett.*, 60, p.1921, 1992.

Moreover, embodiments of the invention are not limited to light pulses of short duration. In general, the light used to probe the fiber can be a light pulse having any duration or can be continuous illumination. For example, the light can be an extremely short light pulse (e.g., picosecond pulses or shorter). Alternatively, the fiber can be probed using light having extremely long duration (e.g., seconds or longer, such as light from continuous wave laser). Such long light pulses may be used in monitoring the integrated transmission loss near a bandgap edge for a long photonic crystal fiber (e.g., 10's to 100's of kilometers).

Nor are embodiments of the invention limited to coherent light pulses. For example, the light pulses can be incoherent light pulses from, e.g., light-emitting diodes or arc lamps.

In some embodiments, no external light source is necessary and the light is obtained from the heated portion of the fiber itself during the drawing operation.

Moreover, the invention is not limited to probing the fiber with three discrete wavelengths only. Any number of wavelengths, or wavelength bands, can be used. For example, for a suitably fast detection scheme, entire bandgap can be probed by a broadband source. Alternatively, or additionally, a single wavelength can be used to probe the transmission loss and transmission loss change at a single position in the bandgap. In general, the spectral content of the light is dictated by the spectral transmission properties of the waveguide being monitored and the spectral and temporal resolution of the detection scheme available.

A number of embodiments of the invention have been described. Nevertheless, it will be understood that various modifications may be made without departing from the spirit and scope of the invention. For example, the strength of a signal transmitted by a waveguide may be monitored additionally, or alternatively, to the backscattered signal. Accordingly, other embodiments are within the scope of the following claims.

What is claimed is:

1. A method comprising:
   launching test light into an end of a photonic crystal fiber;
   detecting measurement light reflected from within the photonic crystal fiber in response to the launched test light; and
   determining information about a defect within the photonic crystal fiber according to the measurement light.

2. The method of claim 1, wherein the test light comprises a test pulse at a first wavelength.

3. The method of claim 1, wherein the test light comprises a test pulse at multiple wavelengths.

4. The method of claim 1, wherein the test light comprises multiple pulses each at a different wavelength.

5. The method of claim 1, further comprising measuring a first measurement signal corresponding to the intensity of the measurement light at a first wavelength, the first wavelength being related to a bandgap of the photonic crystal fiber.

6. The method of claim 5, wherein the first wavelength is near the edge of the bandgap of the photonic crystal fiber.

7. The method of claim 5, further comprising measuring a second measurement signal corresponding to the intensity of the measurement light at a second wavelength different from the first wavelength, the second wavelength being related to the bandgap of the photonic crystal fiber.

8. The method of claim 7, wherein determining the quality of the photonic crystal fiber comprises determining a difference between the first measurement signal and the second measurement signal.

9. The method of claim 7, wherein the first wavelength is selected near to a first edge of a bandgap of the photonic crystal fiber.

10. The method of claim 9, wherein the second wavelength is selected near to a second edge of the bandgap of the photonic crystal fiber.

11. The method of claim 10, further comprising measuring a third measurement signal corresponding to the intensity of the measurement light at a third wavelength different from the first and second wavelengths, the third wavelength being selected near to the center of the bandgap of the photonic crystal fiber.

12. The method of claim 9, wherein the second wavelength is selected near to the center of the bandgap of the photonic crystal fiber.

13. The method of claim 7, wherein monitoring the quality of the photonic crystal fiber includes differentiating between different photonic crystal fiber defects based on the function of the first measurement signal and the second measurement signal.

14. The method of claim 13, wherein the different photonic crystal fiber defects include layer defects and core radius defects.

15. The method of claim 13, wherein the function is based on the difference between the first measurement signal intensity and the second measurement signal.

16. The method of claim 13, wherein the function is the difference between the first measurement signal and the second measurement signal.

17. The method of claim 1, further comprising measuring a time lapse between launching the test light and detecting the measurement light and determining a distance related to the time lapse.

18. The method of claim 1, wherein detecting the measurement light comprises detecting the measurement light from the end of the photonic crystal fiber.

19. The method of claim 1, wherein the detecting the measurement light further comprises detecting backscattered light from the photonic crystal fiber in response to the launched test light.

20. The method of claim 1, further comprising drawing a photonic crystal fiber preform into the photonic crystal fiber wherein determining the quality of the photonic crystal fiber occurs during the drawing.

21. The method of claim 1, further comprising cabling the photonic crystal fiber wherein determining the quality of the photonic crystal fiber occurs during the cabling.

22. The method of claim 1, wherein the photonic crystal fiber is a Bragg fiber.

23. The method of claim 1, wherein launching the test light comprises heating a photonic crystal fiber preform to cause thermal emission of the test light.

24. The method of claim 1, wherein determining the quality of the photonic crystal fiber includes monitoring relative changes of the measurement light intensity about a center wavelength of the bandgap of the photonic crystal fiber.

25. The method of claim 24, wherein determining the quality of the photonic crystal fiber includes differentiating between different photonic crystal fiber defects based on the relative changes of the measurement light intensity.

26. The method of claim 24, wherein the different photonic crystal fiber defects include layer defects and core radius defects.

27. The method of claim 1, wherein information about the defect comprises the presence of the defect.

28. An apparatus, comprising:
   a light source capable of providing test light at a first wavelength related to a bandgap of a photonic crystal fiber;
   an optical assembly positioned to direct light from the light source into an end of the photonic crystal fiber and to collect light reflected from within the photonic crystal fiber;
   a detector positioned to detect the light collected from the photonic crystal fiber in response to the test light, and the detector is capable of detecting light at the first wavelength; and
   an electronic controller coupled to the light source and detector, wherein during operation the electronic controller causes the light source to emit test light having a first component at the first wavelength and the controller records an the intensity of a first measurement signal corresponding to the first test light component, and the controller determines information about a defect within the photonic crystal fiber from a function of the intensity of the first measurement signal.

29. The apparatus of claim 28, wherein the light source is capable of emitting test light having a second component at a second wavelength different from the first wavelength, and wherein the second wavelength is related to the bandgap of the photonic crystal fiber.

30. The apparatus of claim 29, wherein the function of the intensity of the first and second measurement signals is based on a difference between the first and second measurement signals.

31. The method of claim 29, wherein the function of the intensity of the first and second measurement signals is a difference between the first and second measurement signals.

32. The apparatus of claim 29, wherein the first wavelength is near a first edge of the photonic bandgap of the photonic crystal fiber.

33. The apparatus of claim 32, wherein the second wavelength is near a second edge of the photonic band gap of the photonic crystal fiber, the second edge being different from the first edge.

34. The apparatus of claim 32, wherein the second wavelength is near the center of the photonic bandgap of the photonic crystal fiber.

35. The apparatus of claim 28, further comprising a photonic crystal fiber preform wherein at least a portion of the optical assembly is positioned within a hollow core of a photonic crystal fiber preform from which the photonic crystal fiber is drawn.

36. The apparatus of claim 28, wherein the optical assembly comprises a length of photonic crystal fiber.

37. The apparatus of claim 28, wherein the photonic crystal fiber is a Bragg fiber.

38. The apparatus of claim 28, further comprising a photonic crystal fiber drawing apparatus, wherein the electronic controller causes the light source to emit test light and records the intensity of the first measurement signal while the photonic crystal fiber is drawn using the photonic crystal fiber drawing apparatus.

39. The apparatus of claim 28, further comprising a photonic crystal fiber cabling apparatus, wherein the electronic controller causes the light source to emit test light and records the intensity of the first measurement signal while the photonic crystal fiber is cabled using the photonic crystal fiber cabling apparatus.

40. The apparatus of claim 28, wherein during operation the controller monitors a time lapse between the light source emitting the test light and the detector detecting the corresponding measurement signal.

41. A method for monitoring the quality of an optical waveguide, the method comprising:
   launching test light into an end of the optical waveguide;
   detecting measurement light reflected from within the optical waveguide in response to the test light;
   measuring a first measurement signal related to the measurement light intensity at a first wavelength and a second measurement signal related to the measurement light intensity at a second wavelength; and
   monitoring the quality of the optical waveguide based on a function of the first measurement signal and the second measurement signal.

42. The method of claim 41, wherein the test light comprises a test pulse at the first wavelength.

43. The method of claim 42, wherein the test light comprises a second pulse at the second wavelength.

44. The method of claim 41, wherein the optical waveguide comprises a photonic crystal fiber and the first and second wavelengths are related to a bandgap of the photonic crystal fiber.

45. The method of claim 44, wherein the first wavelength is located near a first edge of the bandgap.

46. The method of claim 45, wherein the second wavelength is located near the center of the bandgap.

47. The method of claim 45, wherein the second wavelength is located near a second edge of the bandgap different from the first edge.

48. The method of claim 44, wherein monitoring the quality of the photonic crystal fiber includes differentiating between different photonic crystal fiber defects based on the function of the first measurement and the second measurement signal.

49. The method of claim 48, wherein the different photonic crystal fiber defects include layer defects and core radius defects.

50. The method of claim 41, further comprising cabling the optical waveguide wherein monitoring the quality of the optical fiber occurs during the cabling.

51. The method of claim 41, wherein the test light comprises light having a desired mode.

52. The method of claim 41, wherein the optical waveguide has a hollow core.

53. The method of claim 41, wherein detecting the measurement light comprises detecting the measurement light emitted from the end of the optical waveguide.

54. The method of claim 41, wherein optical waveguide comprises an optical fiber.

55. The method of claim 41, wherein the test light comprises a test pulse at multiple wavelengths including the first and second wavelengths.

56. The method of claim 41, further comprising measuring a time lapse between the launching of the test light and the detecting the measurement light, and determining a position of a defect in the optical waveguide according to the time lapse.

57. The method of claim 41, wherein the function is based on a difference between the first measurement signal and the second measurement signal.

58. The method of claim 41, wherein the function is the difference between the first measurement signal and the second measurement signal.

59. The method of claim 41, further comprising drawing an optical waveguide preform to form the optical waveguide wherein monitoring the quality of the optical waveguide occurs during drawing.

60. A method for monitoring a quality of a photonic crystal fiber, the method comprising:
   launching test light into an end of the photonic crystal fiber;
   detecting measurement light reflected from within the photonic crystal fiber in response to the launched test light;
   measuring a first measurement signal corresponding to the intensity of the measurement light at a first wavelength near the edge of a bandgap of the photonic crystal fiber; and
   determining the quality of the photonic crystal fiber based on the first measurement signal.

61. A method for monitoring a quality of a photonic crystal fiber, the method comprising:
   launching test light into an end of the photonic crystal fiber;
   detecting measurement light reflected from within the photonic crystal fiber in response to the launched test light;
   measuring a time lapse between launching the test light and detecting the measurement light; and
   determining the quality of the photonic crystal fiber according to the measurement light.

62. The method of claim 61, wherein determining the quality of the photonic crystal fiber comprises determining a distance related to the time lapse.

63. The method of claim 62, wherein the distance is related to the location of a defect within the photonic crystal fiber.

64. A method for monitoring a quality of a photonic crystal fiber, the method comprising:
- drawing a photonic crystal fiber preform into the photonic crystal fiber;
- launching test light into an end of the photonic crystal fiber while drawing the photonic crystal fiber;
- detecting measurement light reflected from within the photonic crystal fiber in response to the launched test light; and
- determining the quality of the photonic crystal fiber according to the measurement light.

65. A method for monitoring a quality of a photonic crystal fiber, the method comprising:
- cabling the photonic crystal fiber;
- launching test light into an end of the photonic crystal fiber while cabling the photonic crystal fiber;
- detecting measurement light reflected from within the photonic crystal fiber in response to the launched test light; and
- determining the quality of the photonic crystal fiber according to the measurement light.

66. An apparatus for monitoring the quality of a photonic crystal fiber, comprising:
- a photonic crystal fiber drawing apparatus;
- a light source capable of providing test light at a first wavelength related to a bandgap of the photonic crystal fiber;
- an optical assembly positioned to direct light from the light source into an end of the photonic crystal fiber and to collect light reflected from within the photonic crystal fiber;
- a detector positioned to detect the light collected from the photonic crystal fiber in response to the test light, and the detector is capable of detecting light at the first wavelength and light at the second wavelength; and
- an electronic controller coupled to the light source and detector, wherein during operation the electronic controller causes the light source to emit test light having a first component at the first wavelength and a second component at the second wavelength and the controller records an the intensity of a first measurement signal corresponding to the first test light component and the intensity of a second measurement signal corresponding to the second test light component, and the controller monitors the quality of the photonic crystal fiber from a function of the intensity of the first and second measurement signals while the photonic crystal fiber is drawn using the photonic crystal fiber drawing apparatus.

67. An apparatus for monitoring the quality of a photonic crystal fiber, comprising:
- a photonic crystal fiber cabling apparatus;
- a light source capable of providing test light at a first wavelength related to a bandgap of the photonic crystal fiber;
- an optical assembly positioned to direct light from the light source into an end of the photonic crystal fiber and to collect light reflected from within the photonic crystal fiber;
- a detector positioned to detect the light collected from the photonic crystal fiber in response to the test light, and the detector is capable of detecting light at the first wavelength and light at the second wavelength; and
- an electronic controller coupled to the light source and detector, wherein during operation the electronic controller causes the light source to emit test light having a first component at the first wavelength and a second component at the second wavelength and the controller records an the intensity of a first measurement signal corresponding to the first test light component and the intensity of a second measurement signal corresponding to the second test light component, and the controller monitors the quality of the photonic crystal fiber from a function of the intensity of the first and second measurement signals while the photonic crystal fiber is cabled using the photonic crystal fiber cabling apparatus.

* * * * *

UNITED STATES PATENT AND TRADEMARK OFFICE
CERTIFICATE OF CORRECTION

PATENT NO. : 6,879,386 B2
DATED : April 12, 2005
INVENTOR(S) : Max Shurgalin et al.

It is certified that error appears in the above-identified patent and that said Letters Patent is hereby corrected as shown below:

<u>Column 16,</u>
Line 53, replace "an the intensity" with -- an intensity --.

<u>Column 20,</u>
Line 2, replace "an the intensity" with -- an intensity --.
Line 32, replace "an the intensity" with -- an intensity --.

Signed and Sealed this

Fifteenth Day of November, 2005

JON W. DUDAS
*Director of the United States Patent and Trademark Office*